United States Patent [19]

McAuliffe et al.

[11] Patent Number: 5,838,790
[45] Date of Patent: Nov. 17, 1998

[54] ADVERTISEMENT AUTHENTICATION SYSTEM IN WHICH ADVERTISEMENTS ARE DOWNLOADED FOR OFF-LINE DISPLAY

[75] Inventors: Jon D. McAuliffe; Brian D. Marsh, both of New York; Mark A. Moraes, Forest Hills, all of N.Y.

[73] Assignee: Juno Online Services, L.P., New York, N.Y.

[21] Appl. No.: 635,275

[22] Filed: Apr. 19, 1996

[51] Int. Cl.[6] .................................................. H04K 1/00
[52] U.S. Cl. ............................................. 380/4; 380/23
[58] Field of Search ........................................ 380/4, 23

[56] References Cited

U.S. PATENT DOCUMENTS

| | | |
|---|---|---|
| 4,281,216 | 7/1981 | Hogg et al. . |
| 4,450,535 | 5/1984 | de Pommery et al. . |
| 4,528,643 | 7/1985 | Freeny, Jr. . |
| 4,602,279 | 7/1986 | Dworkin . |
| 4,941,175 | 7/1990 | Enescu et al. . |
| 4,962,532 | 10/1990 | Kasiraj et al. . |
| 4,992,940 | 2/1991 | Freeman . |
| 5,036,314 | 7/1991 | Barillari et al. .............................. 345/2 |
| 5,058,162 | 10/1991 | Santon et al. . |
| 5,105,184 | 4/1992 | Pirani et al. . |
| 5,117,458 | 5/1992 | Takaragi et al. . |
| 5,136,642 | 8/1992 | Kawamura et al. . |
| 5,167,011 | 11/1992 | Priest . |
| 5,220,501 | 6/1993 | Lawlor et al. . |
| 5,241,599 | 8/1993 | Bellovin et al. . |
| 5,245,656 | 9/1993 | Loeb et al. . |
| 5,265,033 | 11/1993 | Vajk et al. . |
| 5,283,731 | 2/1994 | Lalonde et al. . |
| 5,305,195 | 4/1994 | Murphy . |
| 5,319,455 | 6/1994 | Hoarty et al. . |
| 5,325,310 | 6/1994 | Johnson et al. . |
| 5,337,357 | 8/1994 | Chou et al. . |
| 5,347,632 | 9/1994 | Filepp et al. . |

(List continued on next page.)

OTHER PUBLICATIONS

Derringer, Pam, "Freemark Delays Release of Free E–Mail Until Apr.," *Mass High Tech,* Feb. 19, 1966.

Gallagher, Suzanne E., "Pressing E–Mail's Mass–Market Advantage," *D M News,* Mill Hollow Corporation, Nov. 27, 1995.

Wilder Clinton, "Free E–Mail —For A Price," *Information Week,* Nov. 27, 1995.

"Free e–mail service launched by FreeMark," *Link Up,* Oct. 1995.

Soltes, Fiona, "Hanging 10 on the Internet not as costly as you might think," *The Tennessean,* Aug. 16, 1995.

Mohan, Suruchi, "Firm to offer free 'net mail," *Computerworld,* Jul. 10, 1995.

Abate, Tom, "Advertising Sponsorship is growing on the Internet," *The Middletown Press,* Jul. 1, 1995.

O'Connor, Rory, "Ads to pay for free e–mail service," *Calgary Herald,* Jun. 29, 1995.

Harler, Curt, "Distribute Coupons Via E–Mail," *R I S/Retail Info systems News.* Jan. 1996.

(List continued on next page.)

*Primary Examiner*—David C. Cain
*Attorney, Agent, or Firm*—Kenyon & Kenyon

[57] ABSTRACT

A system and method for authenticating that advertisements are properly displayed at a remote computer. The advertisements are received electronically and are stored in a memory device at the remote computer. The advertisements are output to users when the remote computer is off-line. Each advertisement is authenticated by the remote computer prior to output to ensure, for example, that the advertisement has not been tampered with, modified or replaced. Information as to when advertisements are output is recorded and used for billing the advertisers. This information can be stored in a statistics file on the remote computer. When the statistics file is transferred to a central computer, the statistics file is authenticated to ensure that it has not been tampered with, modified or replaced. The authentication scheme can be used as part of an electronic mail system.

50 Claims, 10 Drawing Sheets

U.S. PATENT DOCUMENTS

| | | |
|---|---|---|
| 5,351,293 | 9/1994 | Michener et al. . |
| 5,351,294 | 9/1994 | Matsumoto et al. . |
| 5,353,218 | 10/1994 | De Lapa et al. . |
| 5,361,393 | 11/1994 | Rossillo . |
| 5,381,481 | 1/1995 | Gammie et al. . |
| 5,388,211 | 2/1995 | Hornbuckle . |
| 5,404,393 | 4/1995 | Remillard . |
| 5,404,505 | 4/1995 | Levinson . |
| 5,414,773 | 5/1995 | Handelman . |
| 5,416,840 | 5/1995 | Cane et al. . |
| 5,426,594 | 6/1995 | Wright et al. . |
| 5,428,606 | 6/1995 | Moskowitz . |
| 5,434,918 | 7/1995 | Kung et al. . |
| 5,434,978 | 7/1995 | Dockter et al. . |
| 5,442,706 | 8/1995 | Kung . |
| 5,442,771 | 8/1995 | Filepp et al. . |
| 5,446,919 | 8/1995 | Wilkins . |
| 5,451,998 | 9/1995 | Hamrick . |
| 5,455,941 | 10/1995 | Okuno et al. . |
| 5,467,396 | 11/1995 | Schossow et al. . |
| 5,469,569 | 11/1995 | Grube et al. . |
| 5,475,753 | 12/1995 | Barbara et al. . |
| 5,479,511 | 12/1995 | Naccache . |
| 5,483,466 | 1/1996 | Kawahara et al. . |

OTHER PUBLICATIONS

Mohan, Suruchi, "Free Main on the net forces users to trade off privacy," *Computerworld,* Nov. 27, 1995.

Cororan, Elizabeth, "The Marketers are On–Lining Up for You," *Washington Post,* Sep. 27, 1995.

O'Connor, Rory J., "Free e–mail Serv ice Slated For the Fall; Limited Urban Areas To Try Out Advertiser–Supported Messaging Service," *Austin American–Statesman,* Jul. 1, 1995.

"Productview Interactive To Launch Free EMAIL Service This Year," *M2 Communications, M2 Presswire,* Jun. 28, 1995.

Cororan, Elizabeth, "The Marketers Are On–Lining Up For You; Interactive Ads, Other Gimmicks Kick Off the Internet's New Era," *The Washington Post,* Sep. 27, 1995.

"FreeMark Communications and SportsTicker enter online sports information distribution agreement; Popular sports content first of a series of innovative content offerings to be delivered free to email users," *Business Wire,* Jan. 30, 1996.

"FreeMail Part Two, Two Companies Announce Free Internet E–Mail Services," *Multimedia & Videodisc Monitor,* Information Access Company, Aug. 1995.

Memon, Farhan, "Free E–Mail is here but with ads aplenty," *New York Post,* Jul. 27, 1995.

Wingfield, Nick, "Juno Offers free E–mail service to end–users," *Infoworld,* Jul. 10, 1995.

"Their e–mail could become free mail," *The Record,* Jul. 7, 1995.

Schoenfeld, Adam et al., "Developers Plan Free E–Mail," *Online Marketplace.* Jun. 1995.

Pizzo, Stephen, "On–Line Mortgage Service Will Operate Over Internet," *National Mortgage News,* Oct. 31, 1994.

"Getting Wired With St," *Sunday Times,* Jan. 22, 1995.

"W3.COM Introduces First vistor–Tracking Software For Web Sites," *Business Wire,* Aug. 15, 1995.

"Freeloader, Inc. Announces The First Service Too Deliver The Internet Offline," *PR Newswire,* Jan. 19, 1996.

"Individual Launches Newspage direct," *PR Newswire,* Feb. 9, 1996.

Jaffee, Larry, "No Shortage of Online Choices," *DM News,* Mill Hollow Corporation, Feb. 6, 1995.

Mohan, Suruchi, "Firm to Offer Free Net Mail," *Computerworld,* Jul. 10, 1995.

ADVERTISEMENT AUTHENTICATION SYSTEM IN WHICH ADVERTISEMENTS ARE DOWNLOADED FOR OFF-LINE DISPLAY

FIELD OF INVENTION

The present invention is directed to an electronic advertisement authentication system, and more particularly, to a system for detecting tampering with advertisements that have been electronically downloaded to a remote computer.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

On-line and Internet content and service providers often derive revenue by displaying advertisements to users. For example, when a user accesses a web page on the World Wide Web, an advertisement may be displayed to the user as part of the web page. Advertisements are also shown to users of proprietary on-line services such as the America Online network. Often in such systems, each user accessing a certain screen or site is shown the same advertisement. Sophisticated systems have the capability to change the advertisement after a certain period of time. However, in such systems the user must remain connected to the network in order to see the replacement advertisement.

To reduce on-line communication costs, it is desirable to provide services and content when users are off-line, i.e., when their computers are not connected to a central server.

For example, web pages can be downloaded to a hard disk drive on a user's computer and viewed by the user while off-line. E-mail messages can be created and read while off-line. Doing so requires storing the e-mail messages and advertisements on a local storage device.

One significant disadvantage with such systems is that the user could (either accidentally or deliberately) delete or tamper with any advertisements that were downloaded (e.g., delete advertisements that are part of the downloaded web page). A second significant disadvantage is that the advertiser will not know if the user is exposed to the advertisements that were downloaded as the user may never actually view or use what was downloaded. This reduces the veracity of billings derived from downloading of the advertisements. That an advertisement was transferred to a user's computer provides no assurance to the advertiser that the advertisement was seen at all, let alone in the form in which it was originally intended.

Accordingly, there is a need to provide an authentication system that ensures that advertisements which are downloaded and viewed by a user when off-line have not been tampered with, deleted, replaced or modified. There is a further need for a system that provides accurate information to advertisers as to (a) whether a user is exposed to a downloaded advertisement; and (b) when the user is so exposed, and for how long.

SUMMARY OF THE INVENTION

The present invention is directed to an advertisement authentication system for use when advertisements are stored locally on a user's computer. In the representative embodiment, the present invention detects if an advertisement stored at the user's computer is improperly modified or deleted.

Additionally, the present invention detects if an advertisement is improperly modified or deleted during transfer to the user's computer. In particular, the present invention can determine if the advertisements are improperly modified or deleted during the transfer process when advertisements are downloaded to the user's computer from a remote computer.

According to the present invention, users can be exposed to advertisements when the user's computer is not connected to a remote computer. The representative embodiment of the present invention keeps statistics as to which advertisements are shown to users, for how long, and at what times, and other statistics and events that enable the generation of accurate billing information for advertisers. This information is stored in an advertisement statistics file on the user's computer.

The process of detecting if an advertisement has been improperly modified or deleted can take place when the user's computer is not connected to a remote computer. The results of the detection process are stored in the advertisement statistics file at the user's computer. The present invention also detects if the advertisement statistics file is improperly modified or deleted.

The advertisement statistics file is electronically transferred to a remote computer according to a predetermined transfer scheme. In the representative embodiment, the remote computer detects whether the advertisement statistics file is improperly modified or deleted.

When used herein, the term "advertisement" also includes community service messages, system information messages, logos, slogans and the like, and combinations thereof. Advertisements may include text, graphics, photographs, sounds, video, and the like, and combinations thereof.

Where the context permits, "advertisement" includes "advertisements" and "file of advertisements".

The terms "modified", "replaced", "deleted", "tampered with", "altered" and the like are used interchangeably herein.

For ease of explanation, the present invention is described herein with reference to a representative electronic mail (e-mail) system that downloads advertisements to a user's computer. However, it will be appreciated that the principles of the present invention apply to other personal information delivery systems and to other systems where advertisements are stored locally on a user's computer instead of on a remote server.

A representative e-mail system that stores advertisements locally on a user's computer is now described. Further details of such e-mail system are disclosed in co-pending patent application entitled "Electronic Mail System With Advertisements", in the name of David E. Shaw, Charles E. Ardai, Brian D. Marsh, Mark A. Moraes, Dana B. Rudolph and Jon D. Mc Auliffe, Ser. No. 08/636,729 filed concurrently herewith, and expressly incorporated herein by reference.

Electronic mail is becoming a popular way for people to communicate. Using e-mail, a person can send messages and other information (such as pictures, sound recordings, formatted documents, etc.) electronically to other e-mail users.

Typically, for example, when using e-mail to communicate, a user will create a message using an e-mail program running on a computer that is connected to a computer network, e.g., by modem. The message will include the e-mail address of the intended recipient. When the user has finished entering the message, the user will "send" the message to the intended recipient—the message is electronically transmitted via the computer network to the intended recipient. The recipient, also using an e-mail program running on a computer that can be connected to a computer network, reads the received e-mail message.

One current disadvantage of e-mail communication systems is that the user is often charged, directly or indirectly, for e-mail service. The present invention can be used in conjunction with a system that provides free advertiser sponsored e-mail services to users.

To improve the value of such advertising, the representative e-mail system has capabilities to allow advertisements to be targeted to particular users. Advertisements are distributed and displayed to users regardless of whether the user sends or receives any e-mail messages.

Moreover, the representative e-mail system keeps track of which advertisements are shown to a user, and for how long. As stated above, this information is stored in the advertisement statistics file.

Additionally, the representative e-mail system reduces the cost of providing e-mail services by requiring users to read and compose e-mail messages while off-line (e.g., when not connected to an on-line network.) Thus, the user need only connect to the on-line network when sending (e.g. uploading to the network) or receiving (e.g. downloading from the network) e-mail messages.

In the representative e-mail system described above, advertisements are stored locally at the user's computer so that they can be presented to the user when the user is reading or composing e-mail messages, i.e., while the user's computer is off-line. To ensure that the user is exposed to sponsor's advertisements, the present invention determines if these advertisements are improperly modified, deleted or replaced. The results of this determination process are stored in the advertisement statistics file.

Additionally, the present invention determines if the advertisement statistics file is improperly modified, deleted or replaced.

In the representative embodiment of the present invention, a key-dependent one-way hash function is used to generate fingerprints (i.e., short, unique identifiers) of both the advertisements, which are downloaded to the user's computer ("the client computer"), and the advertisement statistics file, which is generated and updated by the client computer and periodically uploaded to a remote central computer ("the server system"). The fingerprints of the advertisements are transmitted when they are downloaded and fingerprints of statistics files are transmitted when they are uploaded, so that the respective receiving entity (server or client) can detect any tampering that occurred during the transfer process. On the client computers, the fingerprints of the advertisements and statistics file are encrypted so that any tampering with such files that occurs while they are transferred or while they are stored on the client computer can be detected using fingerprints known to be secure.

To encrypt the fingerprints and statistics file, a symmetric block encryption function is used in the preferred embodiment of the present invention. The advertisement and statistics file fingerprints are encrypted prior to transmission so that alteration or substitution of a file while it is en route cannot be masked with a consistent alteration of the file's fingerprint.

As one alternative to the use of a hashing function, the advertisement authentication system of the present invention can be implemented using encryption alone. Thus, rather than using an encrypted fingerprint of a file for authentication purposes, the file itself could simply be transmitted to or from the client computer, and stored on the client computer's hard disk, in encrypted form. However, file encryption prevents use of effective data file compression, since good encryption algorithms produce highly entropic (and thus virtually incompressible) cyphertext. Encrypting a file fingerprint (which is orders of magnitude smaller than the file itself) and sending this along with the unencrypted, compressed file allows for efficient data transmission while retaining file security.

DETAILED DESCRIPTION

Figure 1:
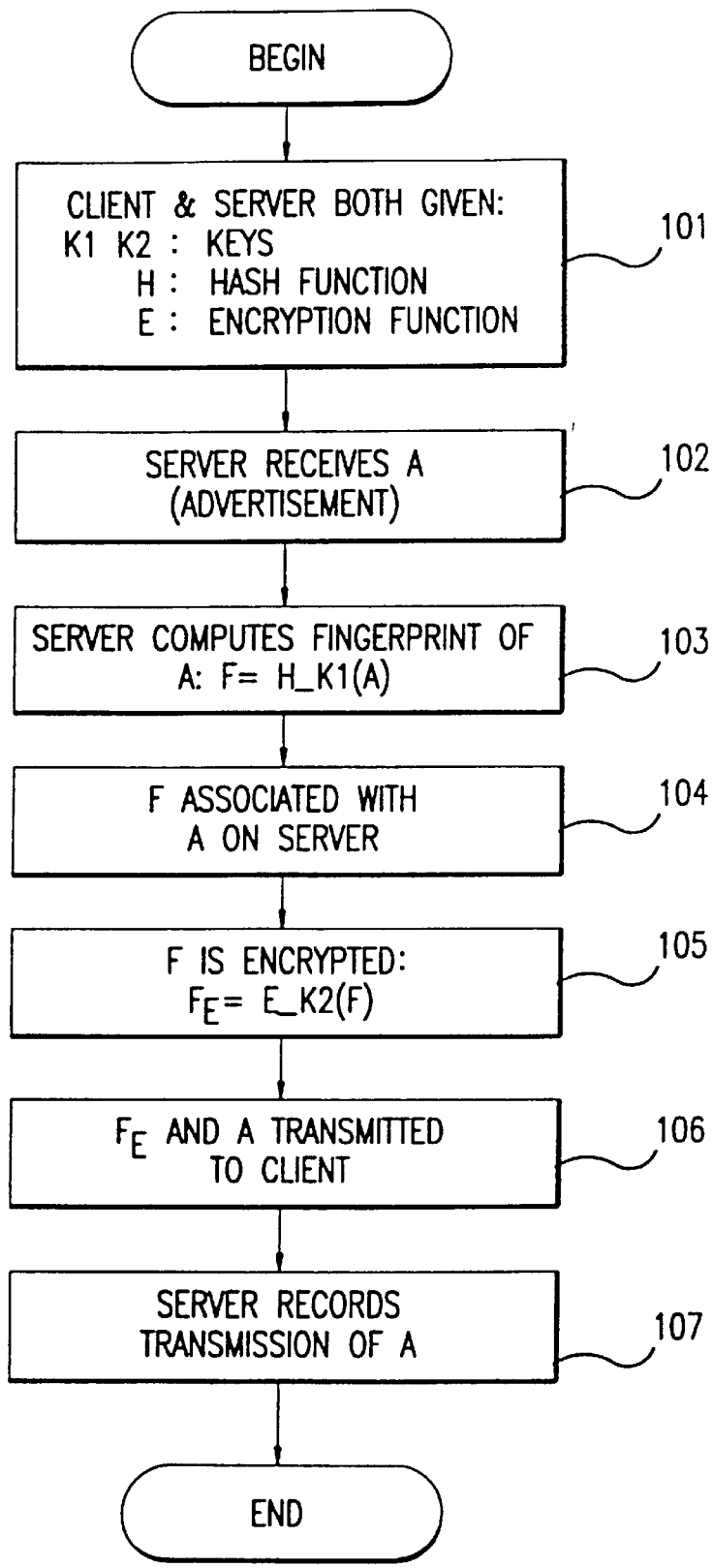
FIG. 1 is a flow chart illustrating the operations performed in downloading an advertisement from the server system to a client computer.
Figure 1A:
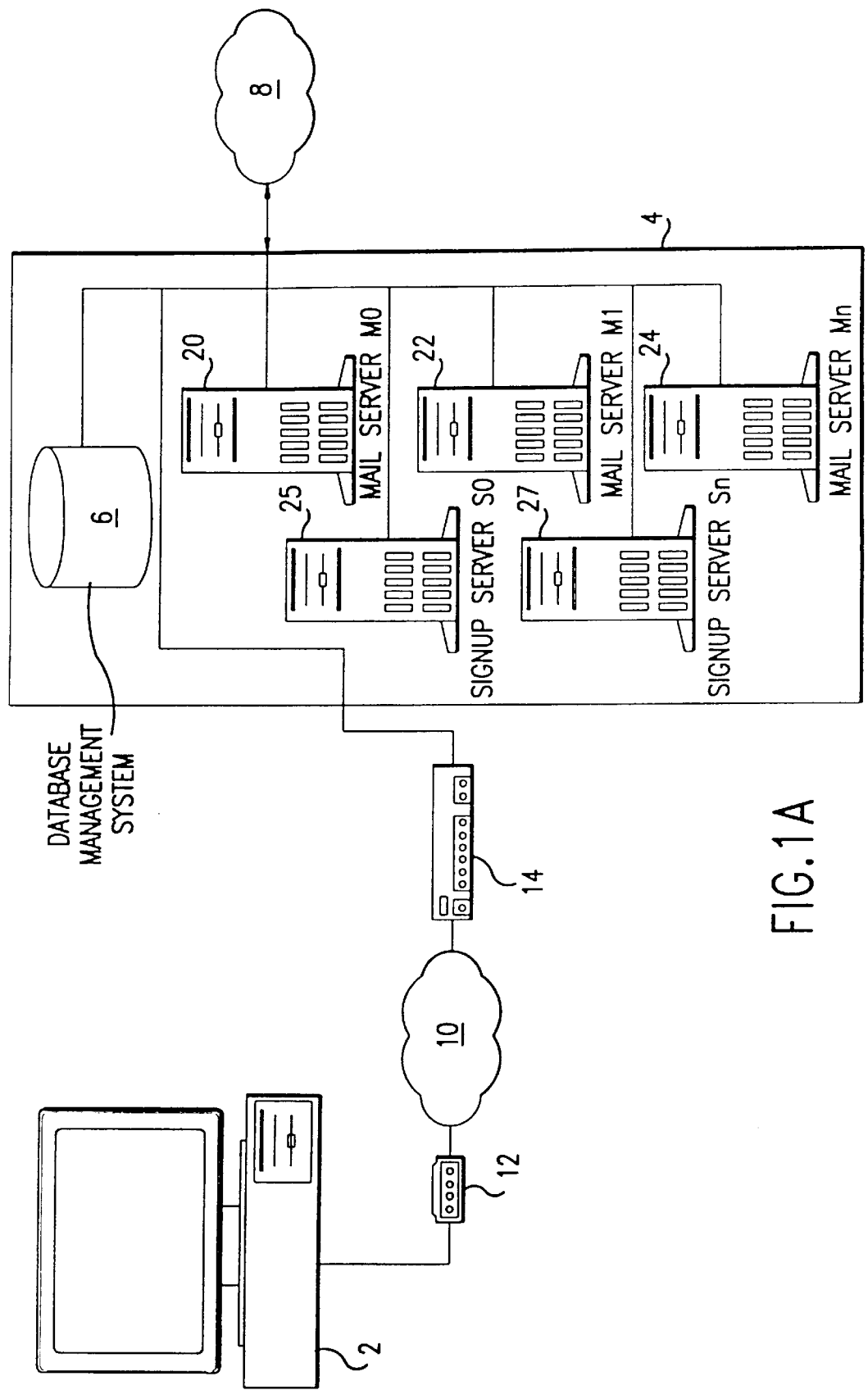
FIG. 1A is a system diagram of a representative e-mail system of the present invention.

Referring now to the drawings, and initially FIG. 1A, there is illustrated a system diagram of an exemplary e-mail system. It will be appreciated that the present invention is described with reference to this e-mail system for convenience only, and that the principles of the present invention apply to other e-mail systems and other applications. In the representative e-mail system, the advertisements are graphics files that are displayed to users on a computer screen. However, the principles of the present invention apply to all types of advertisements that can be output to a user, such as, for example, text, photographic, audio, and video advertisements.

Generally, the advertisement authentication system of the present invention can detect and prevent tampering with advertisement files downloaded from a server system 4 to a user's client computer 2. Furthermore, the present invention detects and prevents tampering with an advertisement statistics file, containing data regarding the duration, time, etc. of display of each advertisement, which is generated and maintained at the client computer 2, and periodically uploaded to the server system 4.

In the representative e-mail system, a client computer 2 is used by each user of the e-mail service and runs a client program. The client computer 2 may be, for example, a personal computer with an Intel Pentium or 486 processor and a Microsoft Windows or OS/2 operating system. The client computer 2 has the capability to connect to a remote computer, e.g., by modem 12 across a telephone or other network 10. The client computer 2 also has a secondary memory device, such as, for example, a hard disk drive. The client program of the present invention is stored on the hard disk drive and is executed by the client computer's processor.

The client program can communicate with a server system 4. In the representative embodiment, the server system comprises a number of mail servers, e.g., 20, 22, 24, a number of signup servers, e.g., 25, 27 and a database management system 6. Each mail server 20, 22, 24 and signup server 25, 27 is a high speed processor with secondary memory. Each mail server 20, 22, 24 and signup server 25, 27 is coupled to the database management system 6 and to an external computer network 8, such as, for example, the Internet. Each of the mail servers 20, 22, 24 executes a server program. The signup servers 25, 27 are used when new users initially create an account with the server system 4. The server system 4 has communication facilities 14 to allow client computers 2 to connect with the server system 4, so that client programs can communicate with server programs.

In the representative embodiment, the client computer 2 is remotely located with respect to the server system 4. Typically, there are many users, each with a client computer 2 executing the client program and capable of communicating with the server system 4. Although the terms "client" and "server" are used herein to describe the representative embodiment, the present invention is not limited to what is known in the art as a client/server architecture.

Whenever a user (i.e., the client program of the user) establishes a connection with the server system 4 (e.g., to send and/or receive e-mail messages), eligible advertisements can be transmitted from the server system 4 to the client program and stored on a memory device (e.g., a hard disk drive) of the client computer 2. An advertisement distribution scheduler of the server system 4 decides which advertisements are eligible for distribution for each user.

The "downloaded" advertisements that are stored locally can then be displayed to the user when the user is off-line, for example, when composing and reading e-mail messages, and when the user is in the process of establishing a connection with the server system. The advertisements can also be displayed when other communications are taking place between the client program and the server system 4.

Thus, the e-mail system of the representative embodiment stores advertisements at the user's client computer 2 so that the advertisements can be displayed when the client computer 2 is not on-line. The display can be changed at periodic intervals when the client program is in use, e.g., every thirty seconds a new advertisement can be displayed.

The client program records (i) which advertisements are shown to the user, for how long and at what times; (ii) when there is a period of inactivity when the client program is running on the client computer, for example, if the user does not enter an instruction for a period of five minutes; and (iii) whether any advertisement has been altered by the user. This information is stored in an advertisement statistics file on the client computer 2 and is communicated to the server system 4 when the client computer 2 establishes a connection with the server system 4 to send and receive e-mail messages. The server system 4 stores each advertisement statistics file in the database management system 6. The information in the advertisement statistics file can be used to create billing information to bill advertisers based on advertisements actually viewed.

Thus, the e-mail system of the representative embodiment can download to a client computer 2 a number of advertisements (which may or may not actually be viewed by the user) and bill the advertisers only for those advertisements displayed to the user. Display of advertisements is controlled by the client program. The client program includes a client display scheduler module that determines which advertisements to display to the user and for how long. A representative advertisement distribution scheduler and display scheduler module are disclosed in co-pending patent application entitled "Method And Apparatus For Scheduling The Presentation Of Messages To Computer Users", in the name of Brian D. Marsh and Mark A. Moraes, Ser. No. 08/636,745, filed concurrently herewith, and expressly incorporated herein by reference.

An advertisement may be downloaded once but viewed many times by a user, thus reducing transmission costs. The advertiser can be billed for the multiple viewings of the advertisement.

In the e-mail system of the representative embodiment, in which advertisements are downloaded and stored on the client computer 2, the present invention detects and safeguards against tampering with the advertisements and advertisement statistics files while they are en route to, or from, or are stored on the client computer 2. The advertisement authentication system of the present invention ensures that advertisers receive true value, i.e., that their advertisements reach remote users unaltered and that the data in the advertisement statistics files, upon which billing is based, is accurate.

Furthermore, when an advertisement is downloaded to the client computer 2 for off-line viewing, the client program of the present invention accounts for the "expiration" of the advertisement. An advertisement may be deemed "expired" if its expiration date has passed or it has been displayed to a particular user a maximum number of times. The advertisement authentication system of the present invention deschedules or removes expired advertisements and accounts for the expired advertisements in the advertisement statistics file. (Advertisements that are descheduled may remain on the secondary memory device of the client computer 2 for potential future resuscitation.) As described herein, advertisements that are transferred from the server system 4 to the client computer 2 are transferred in an advertisement file. It will be appreciated that the advertisement file may comprise one or more advertisements. Also, a single advertisement may be divided into parts and transmitted in two or more files.

FIG. 1 illustrates, in flow chart form, operations performed by the present invention when downloading an advertisement file from the server system 4 to a client computer 2.

Prior to the downloading of any advertisement files to the client computer 2, the client computer 2 and the server system 4 are both provided with (a) two randomly-generated numbers used as keys, K1 and K2; (b) a key-dependent one-way hash function, H; and (c) a symmetric block encryption function, E (step 101). The hash function H is used to generate file fingerprints. In the representative embodiment of the present invention, two keys (i.e., K1 and K2) are used for hashing and for encryption of the fingerprint generated by the hash function. K1 is used as the hashing key and K2 is used as the encryption key. Standard, well-known encryption and hashing algorithms may be used.

Upon reception of an advertisement file A (step 102), the server system 4 generates a fingerprint F of A using the hash function H and key K1 (step 103). The fingerprint F is then associated with the advertisement file A on the server system 4 (step 104). Using the encryption function E and the key K2, the fingerprint F is encrypted to produce $F_E$ (step 105). The advertisement file A (in, e.g., compressed plaintext form) and the encrypted fingerprint $F_E$ are then transmitted to the client computer 2 (step 106), and the server system 4 records that the advertisement file was transmitted to the client computer 2 (step 107).

Figure 2:
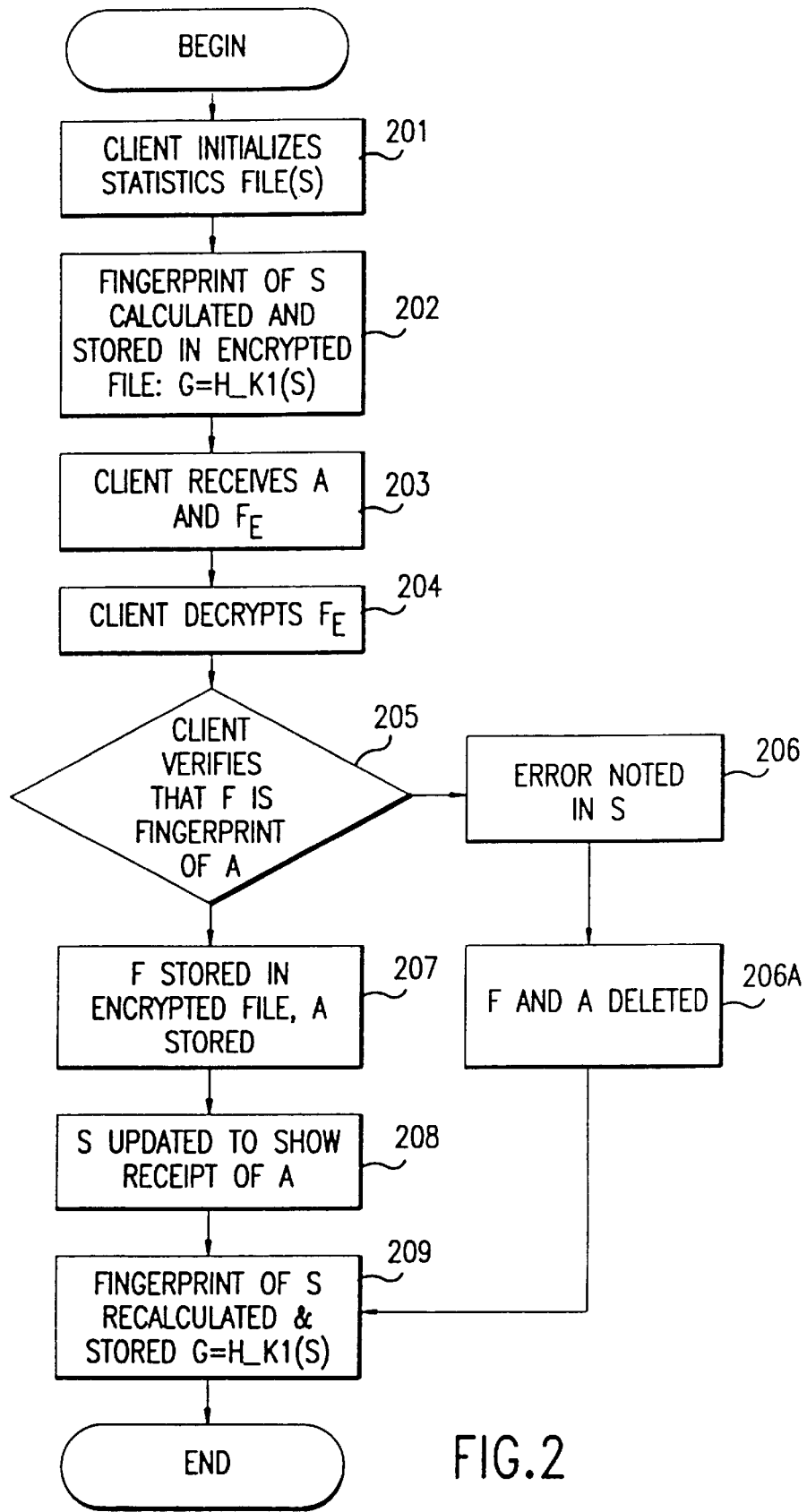
FIG. 2 is a flow chart illustrating the operations performed upon reception of an advertisement by a client computer.

Referring to the flowchart of FIG. 2, the steps performed upon receipt of an advertisement file by a client computer 2 are illustrated. Prior to receiving any advertisement files from the server system 4, the client program creates and initializes an advertisement statistics file S (step 201). Upon subsequent start ups of the client program, the client program checks the existence and authenticity of S. The fingerprint G of S is calculated, using the hash function H and key K1, and stored in an encrypted (i.e., secure) file (step 202).

The processing of an advertisement by the client program begins when an advertisement file A and its encrypted fingerprint $F_E$ are received by the client computer 2 from the server system 4 (step 203). Using the encryption function E and key K2, the client program then decrypts the downloaded encrypted fingerprint $F_E$ to obtain the fingerprint F (step 204). The client program next verifies that the fingerprint of the received advertisement file A, as calculated using the hash function H and key K1, matches the decrypted value F of the fingerprint downloaded from the server system 4 (step 205). If the advertisement authentication fails, i.e., if the decrypted fingerprint F downloaded from the server does not equal the fingerprint of the advertisement file A calculated locally by the client program, then an error notation is made in the advertisement statistics file S indicating a failed authentication, and thus corruption, of the advertisement file A (step 206) and processing of A is discontinued, e.g., the advertisement file A is deleted (step 206A).

If the authentication of the advertisement file A performed in step 205 is successful, then the client program stores F, the fingerprint of A, in an encrypted file and stores A in an advertisement directory on a storage device of the client computer 2 (step 207). The client program then updates the advertisement statistics file S to reflect receipt of the advertisement A (step 208). Following updating of the statistics file S, the client program recalculates the fingerprint G of S, using the hash function H and key K1, and stores G in an encrypted file on the client computer 2 (step 209). Recording the statistics file fingerprint in an encrypted file allows for the detection of subsequent tampering with S.

Figure 3A:
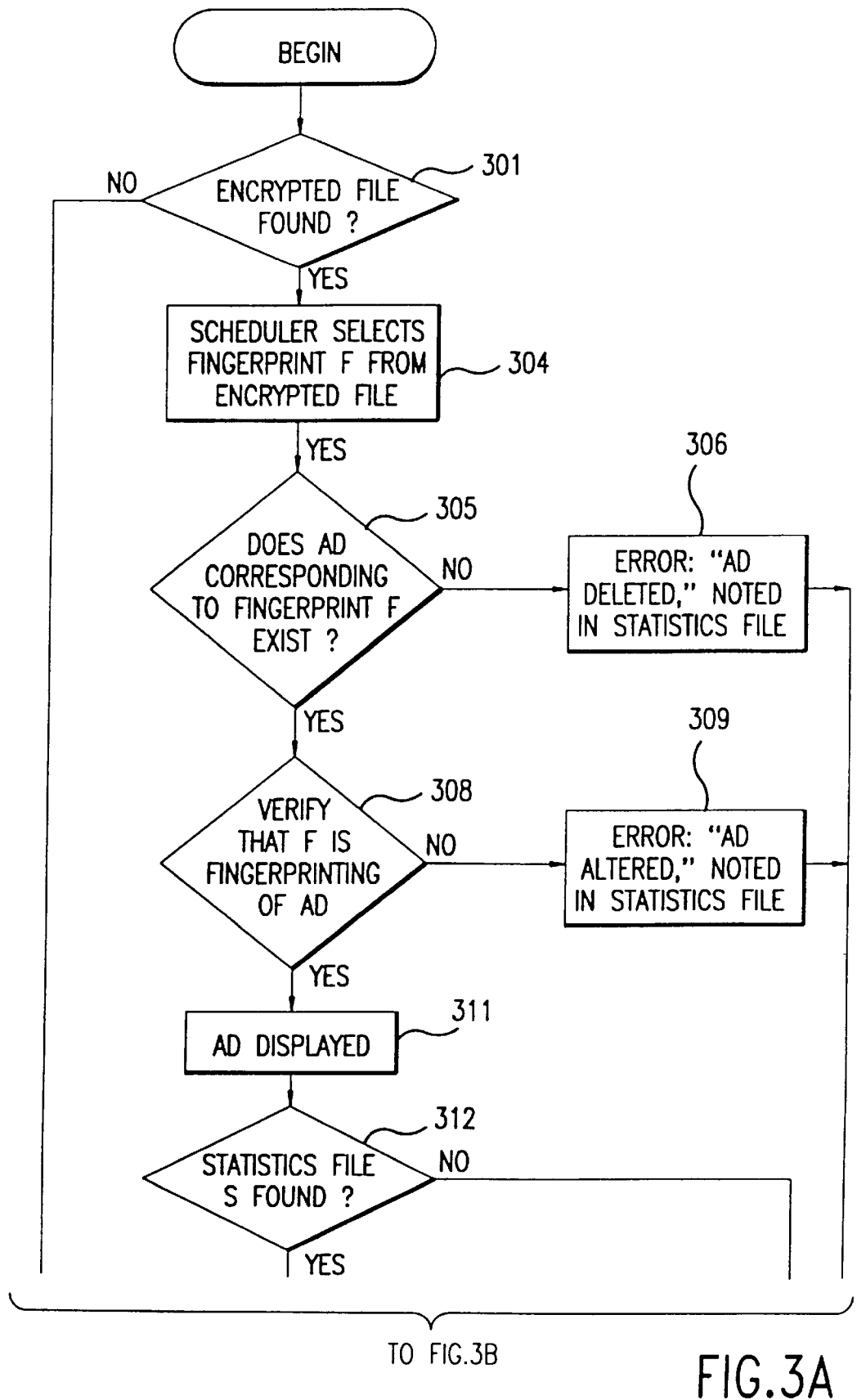
FIG. 3 is a flow chart illustrating the authentication operations performed in displaying an advertisement on a client computer.
Figure 3B:
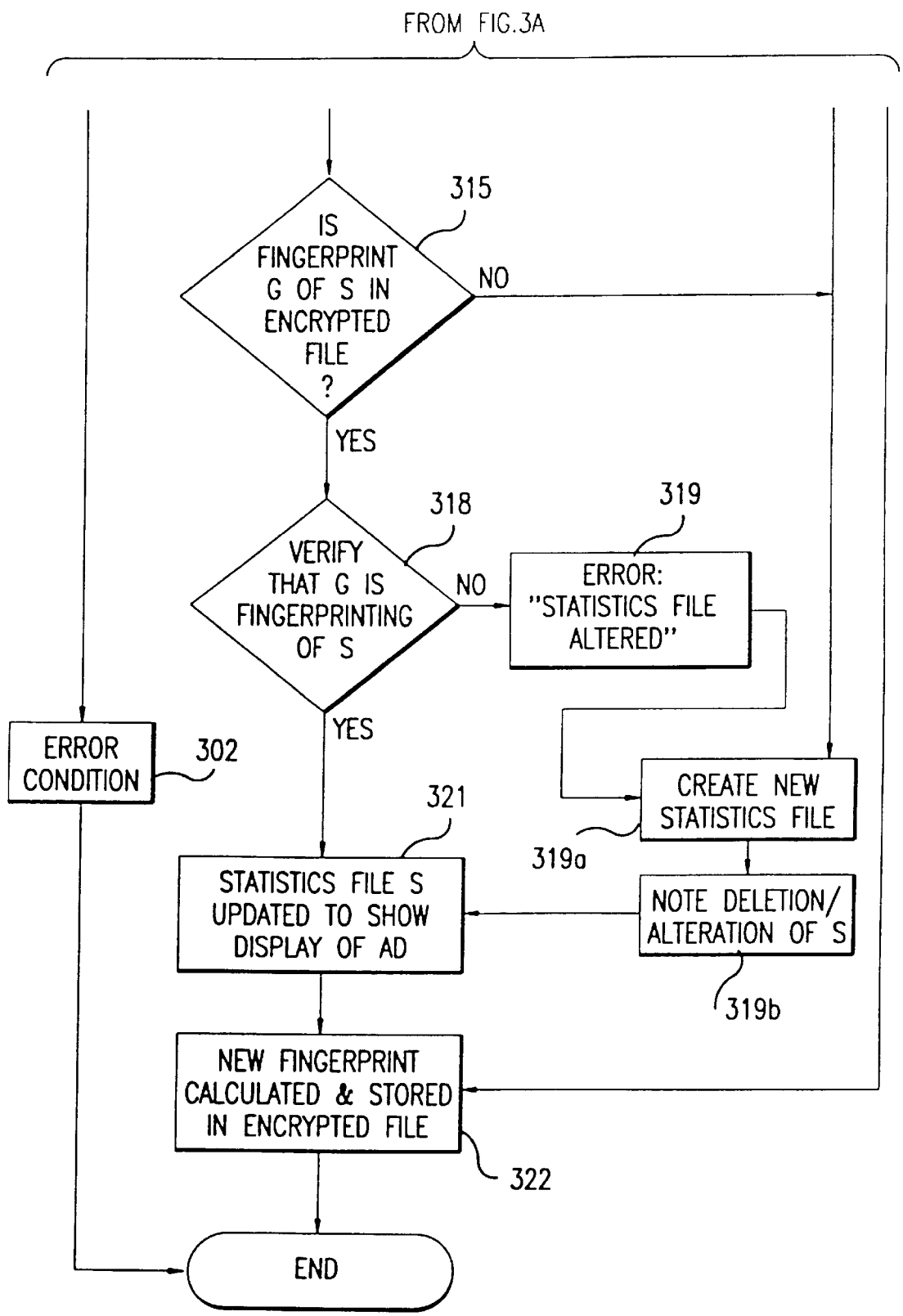

Referring to the flowchart of FIG. 3, the authentication steps performed in outputting an advertisement at a client computer 2 are illustrated. Each time the client scheduler module of the client program prepares to schedule display of an advertisement at the client computer 2, the client scheduler module checks for the encrypted file containing the fingerprints $F_n$ of the advertisement files $A_n$ to be scheduled for display (step 301). If the encrypted file cannot be found, the integrity of all the files in the system is subject to doubt and cannot be guaranteed. The client program invalidates all the advertisements at the client computer 2 as well as statistics file S. A new encrypted file is created and initialized correctly. The current statistics file S is renamed and identified as a possibly corrupt file. The new statistics file is opened, and its fingerprint is computed and stored in the encrypted file. These events are then logged to the new statistics file, and the invalidated advertisements are deleted (step 302). If the client scheduler module locates the encrypted file in step 301, the client scheduler module selects a fingerprint F from the encrypted file in accordance with the scheduling algorithm (step 304). The client program then checks for the advertisement file A corresponding to the selected fingerprint F (step 305). If the client program cannot locate the appropriate advertisement file A, an "Advertisement Deleted" error is noted in the advertisement statistics file S (step 306). The new fingerprint G of the advertisement statistics file S is then calculated, using the hash function H and key K1, and stored in an encrypted file (step 322).

If, in step 305, the appropriate advertisement file A is located, the client program calculates the fingerprint of the retrieved advertisement file A, using the hash function H and key K1, and compares this with the fingerprint F obtained from the encrypted file (step 308). If this authentication fails, i.e., if the calculated fingerprint is not the same as the stored fingerprint for A, then an error message indicating the failed authentication of A is stored in the advertisement statistics file S (step 309). The fingerprint G of the advertisement statistics file S is then recalculated, using the hash function H and key K1, and stored in an encrypted file (step 322).

If the authentication performed in step 308 is successful, i.e. if it is determined that the advertisement file A has not been altered, A is displayed at the client (step 311). Following display of the advertisement A, the client program checks for the advertisement statistics file S (step 312). If S cannot be located, a new instance of S is created (step 319*a*), and the disappearance of S is noted in new S (step 319*b*). If S is located, the client program next checks for the encrypted file on the client computer containing G, the stored fingerprint of S (step 315). (G is stored in the same encrypted file as the advertisement fingerprints F.) If the encrypted file cannot be located, a new instance of S is created (step 319*a*) and the disappearance of S is noted in new S (step 319*b*). If the encrypted file is found, the client program authenticates the advertisement statistics file S by calculating the fingerprint of S, using the hash function H and key K1, and comparing this with G, the fingerprint for S stored in the encrypted file (step 318). If the authentication of S fails, indicating that S has been altered, a new instance of S is created (step 319*a*) and the failed authentication of S is noted in new S (step 319*b*). Old S is moved into a "bad" directory for non-secure (i.e., non-fingerprinted) transmission to the server for diagnostic purposes. The fingerprint of new S is computed and stored in an encrypted file (step 321), and the process continues.

Following the authentication of S, S is updated with the information regarding the display of the advertisement A to the user (step 321). The new fingerprint G of the advertisement statistics file S is then calculated, using the hash function H and key K1, and stored in an encrypted file (step 322).

Figure 4A:
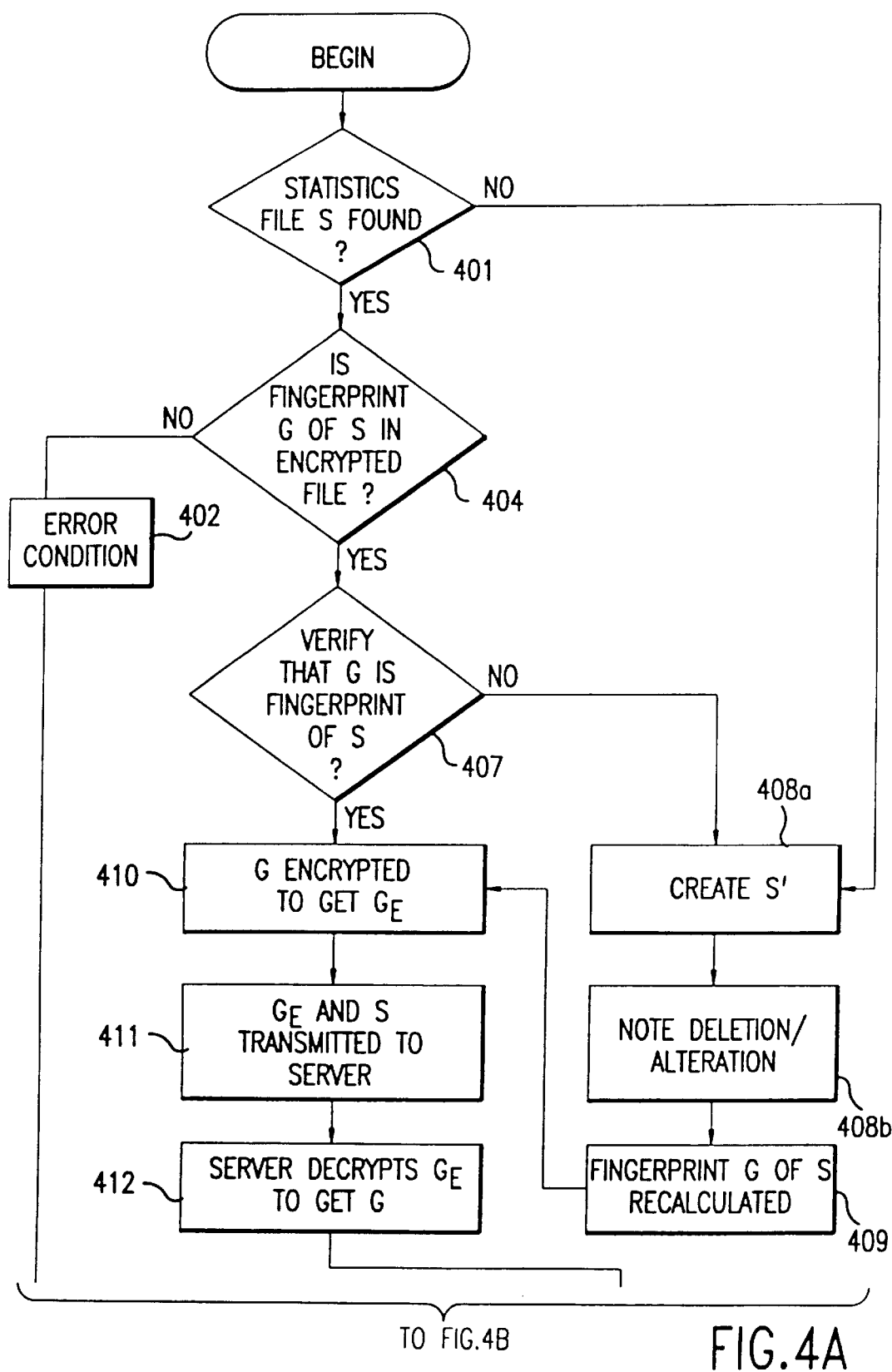
FIG. 4 is a flow chart illustrating the operations performed in transferring an advertisement statistics file from a client computer to the server system.
Figure 4B:
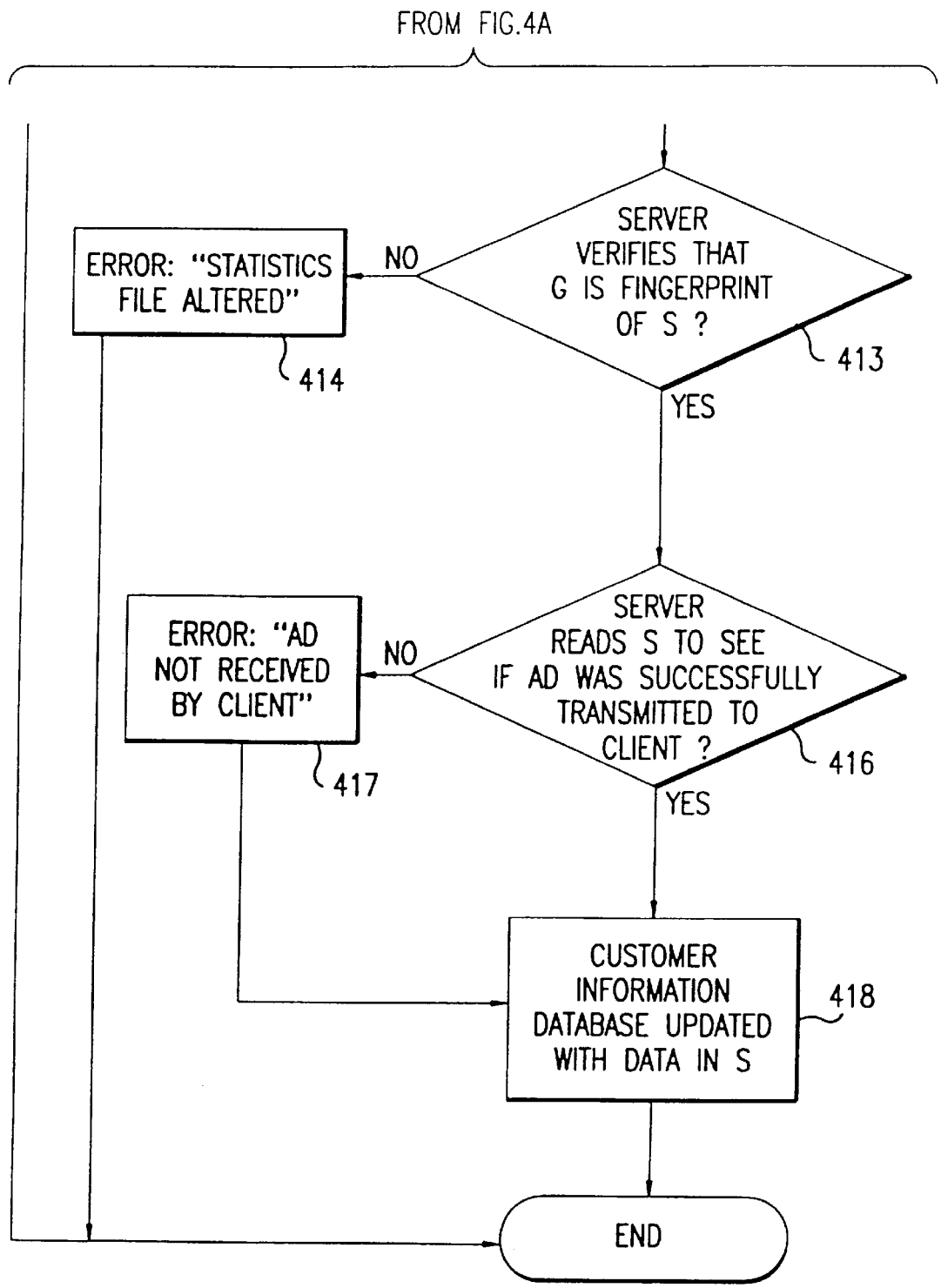

Referring to the flow chart of FIG. 4, the transfer of an advertisement statistics file from a client computer 2 to the server system 4 is illustrated. The advertisement statistics file S on the client computer 2 is uploaded to the server system when the client computer 2 establishes a connection with the server system 4, e.g., to send and receive e-mail messages. Prior to uploading the advertisement statistics file S, the client program checks for the existence of S on the client computer 2 (step 401). If S cannot be located, a new instance of S is created (step 408*a*) and the disappearance of S is noted in new S (step 408*b*). The fingerprint of new S is computed and stored in an encrypted file (step 409), and the process continues. If S is located, the client program next checks for the encrypted file containing the stored fingerprint G of S (step 404). If the encrypted file is located, the client program authenticates S by calculating the fingerprint of S, using the hash function H and key K1, and comparing this with the fingerprint G of S stored in the encrypted file (step 407). If the authentication in step 407 fails, indicating that S has been altered since its fingerprint was last calculated, a new S is created (step 408a), a notation of this error is made in the statistics file (step 408b), and the fingerprint G of S is recalculated and stored in new S (step 409).

Following the authentication of the advertisement statistics file S, the client program encrypts the fingerprint G of S, using the encryption function E and key K2 (step 410). The client computer 2 then transfers the advertisement statistics file S (in, e.g., compressed plaintext form) and its encrypted fingerprint GE to the server system 4 (step 411).

Upon receipt of the advertisement statistics file S and its encrypted fingerprint GE, the server system 4 decrypts GE, using the encryption function E and key K2, to obtain the unencrypted fingerprint G (step 412). The server system 4 then authenticates S by calculating the fingerprint of S, using the hash function H and key K1, and comparing this value with the fingerprint G received from the client computer 2 and decrypted in step 412 (step 413). If the authentication of S fails, indicating that S was altered during the transfer from the client to the server, the server notes the error in, e.g., its customer information database and ceases processing of S (step 414).

If the authentication of the uploaded advertisement statistics file S is successful, the server system 4 then checks the contents of S in order to verify that the advertisement file A, whose transmission to the client computer 2 was recorded by the server system 4 in step 107 (FIG. 1), was successfully received by the client computer 2 (step 416). If the advertisement statistics file S does not reflect that A was successfully received by the client computer 2, the server system 4 notes the failed transmission in, e.g., its customer information database (step 417). The server system 4 then updates its customer information database in the database management system 6 with the advertisement display information recorded in the uploaded advertisement statistics file S (step 418).

Figure 5:
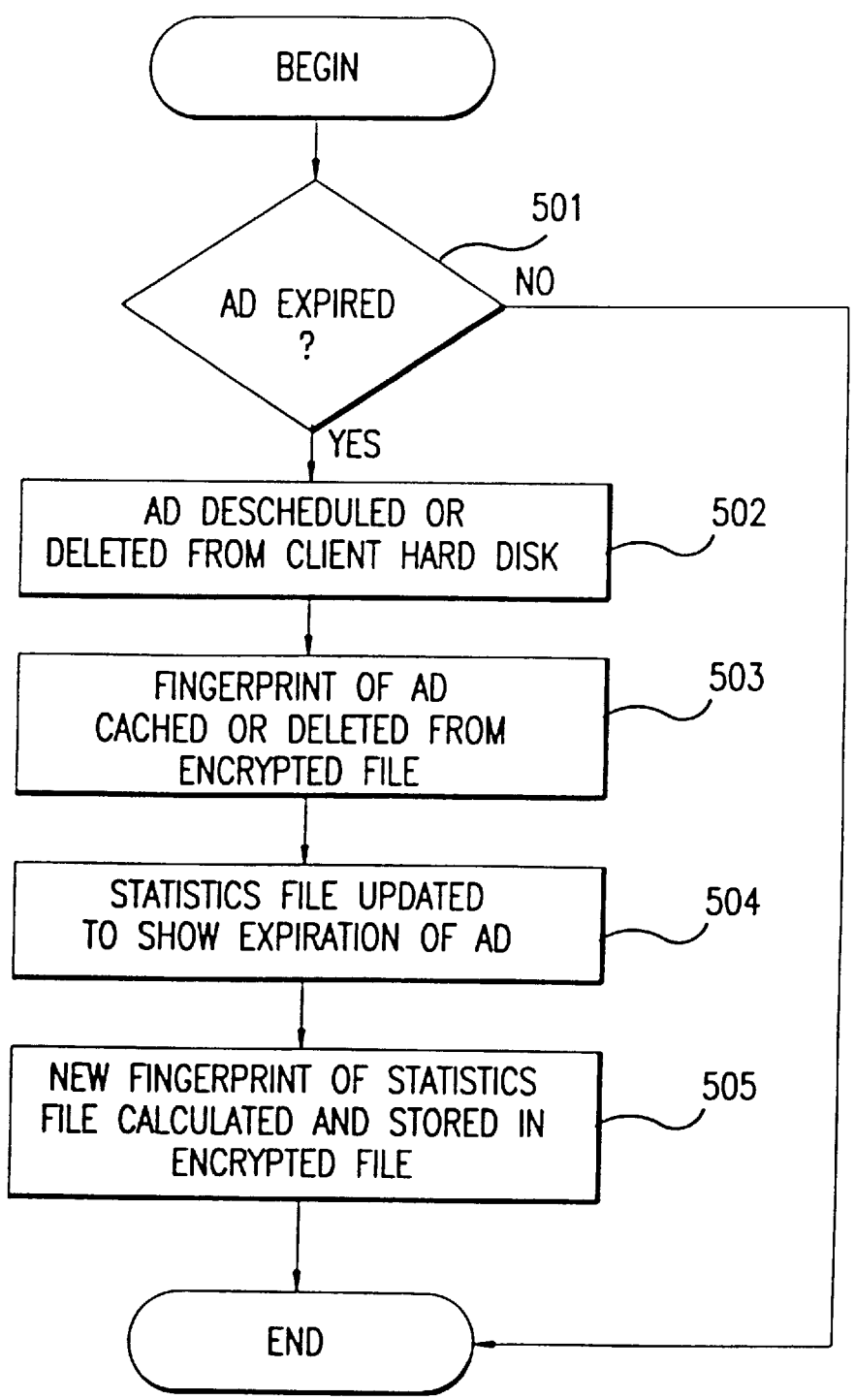
FIG. 5 is a flow chart illustrating the operations performed upon expiration of an advertisement file on a client computer.

Referring to the flow chart of FIG. 5, the steps taken upon expiration of an advertisement file on a client computer 2 are illustrated. An advertisement may be deemed "expired" when, e.g., its designated expiration date has passed or, for each user to which the advertisement was assigned, the advertisement has been displayed at the client computer 2 the maximum designated number of times. If the client program determines that an advertisement A has expired (step 501), the client program deletes or deschedules the advertisement file A from the client computer 2 (step 502). The client program also deletes or caches the fingerprint F of A from the encrypted file on the client computer 2 (step 503). Once the advertisement and its fingerprint are deleted, the present invention will no longer attempt to schedule display of the advertisement. Following removal of the advertisement and its fingerprint from the client system, the client's advertisement statistics file S is updated to reflect the expiration of A (step 504). The fingerprint G of S is then recalculated, using the hash function H and key K1, and stored in an encrypted file on the client computer (step 505).

Figure 6A:
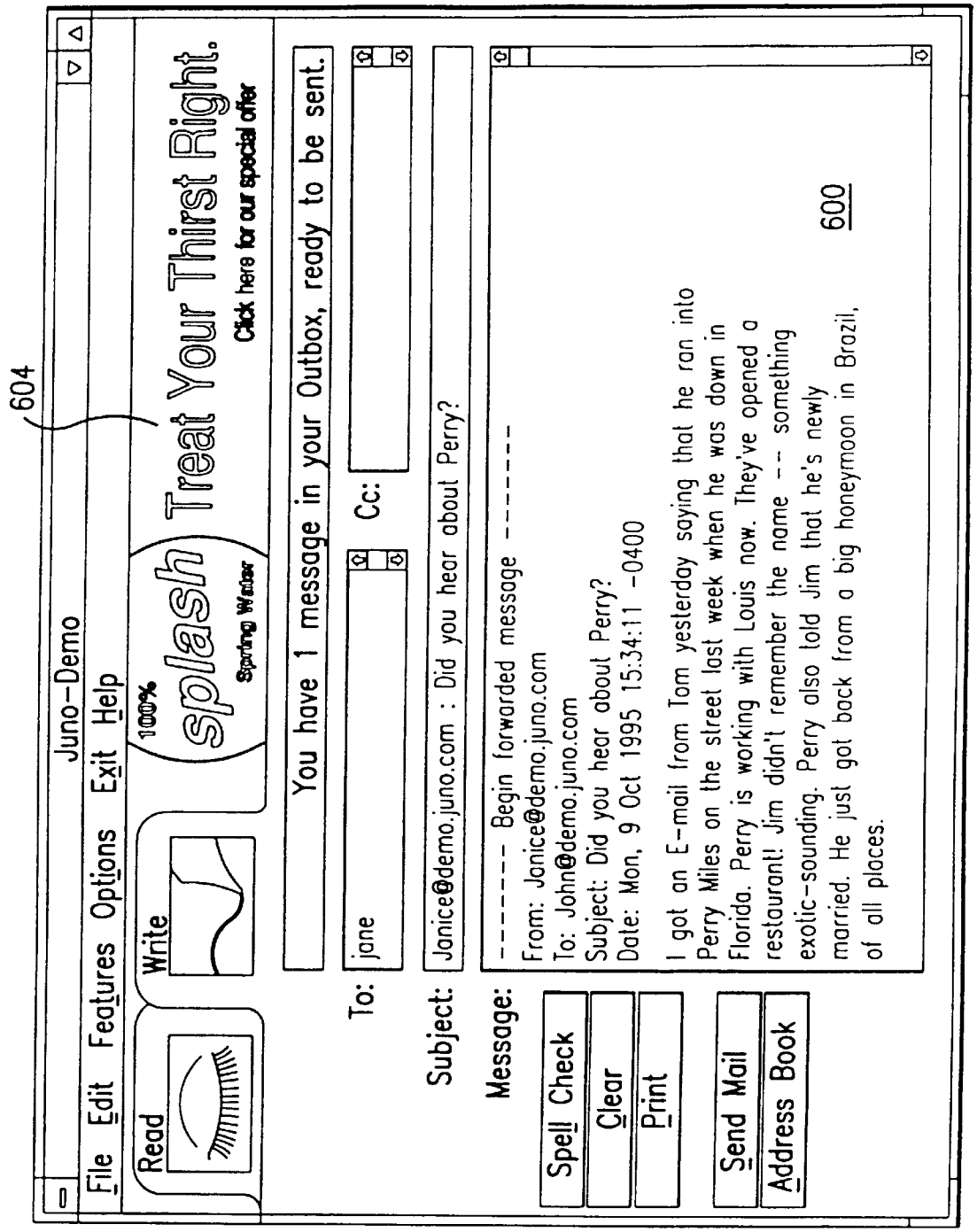
FIGS. 6A and 6B are example client computer screen displays.
Figure 6B:
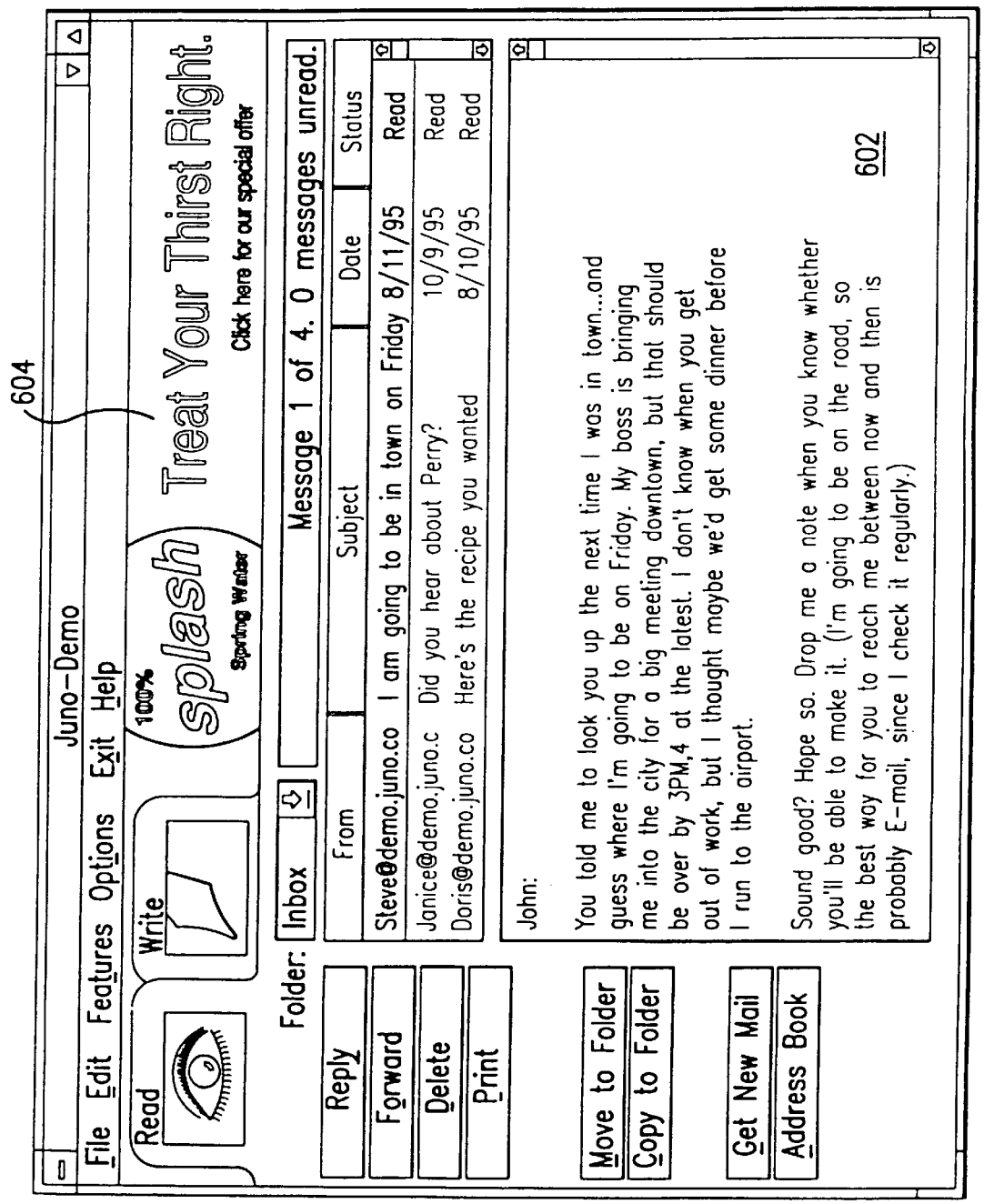

FIGS. 6A and 6B are example screen displays produced by the client computer 2. FIG. 6A shows a screen 600 used to create an e-mail message. FIG. 6B shows a screen 602 used to read an e-mail message. An advertisement 604 is displayed. In the representative embodiment, the user will read and create e-mail messages using these screens 600, 602, when the client computer 2 is not in communication with the server system 4.

As will be appreciated, the advertisement authentication system of the present invention detects various types of tampering (whether malicious or otherwise) that can occur in a system where advertisements are downloaded and stored locally. Generally, tampering that is detected includes: (I) alteration to or deletion of an advertisement file stored on the client computer 2 (e.g., removal of the advertisement altogether or replacement of an advertisement with something other than the intended advertisement); (II) alteration/deletion of an advertisement file during transfer from the server system 4 to the client computer 2; (III) alteration/deletion of the advertisement statistics file stored on the client computer 2; and (IV) alteration/deletion of the advertisement statistics file during transfer of the file from the client computer 2 to the server system 4. These four categories of tampering detection are explained in further detail below:

(I) If an advertisement file stored on the client computer 2 is altered, the fingerprint verification of that file performed prior to display of the advertisement will fail (FIG. 3, step 308). Alteration of the advertisement file cannot be masked by a corresponding alteration of the file's fingerprint, because the fingerprint is stored in an encrypted file on the client computer (FIG. 2, step 207). If an advertisement file stored on the client computer is deleted, the client program will detect this due to the presence of a fingerprint for the advertisement in the encrypted file (FIG. 3, steps 304–305). If the encrypted file itself is deleted, the various data files are reinitialized and the server system 4 is notified. (FIG. 3, steps 301–302).

(II) If the advertisement file is altered en route to the client program, the fingerprint verification performed upon receipt of the advertisement will fail (FIG. 2, step 205). Alteration of the advertisement file cannot be masked by a corresponding alteration of the file's fingerprint, because the fingerprint is in encrypted form during the transfer between server system 4 and client computer 2 (FIG. 1, step 105). If the advertisement file and its fingerprint are intercepted and deleted en route to the client computer 2, the advertisement statistics file will not reflect receipt of A and the server system 4 will detect this when it checks the contents of the uploaded statistics file. (FIG. 4, step 416).

(III) If the advertisement statistics file is modified while stored on the client computer 2, this alteration will be detected when the statistics file is next authenticated (e.g., prior to updating the statistics file or to uploading the file to the server system 4) (FIG. 3, step 318; FIG. 4, step 413). If the advertisement statistics file is deleted from the client computer 2, the various data files are reinitialized and the server system 4 is notified (FIG. 3, step 312; FIG. 4, step 401). Alteration of the advertisement statistics file cannot be masked by a corresponding alteration of the file's fingerprint, because the fingerprint is stored in an encrypted file on the client computer 2 (FIG. 2, steps 202, 209; FIG. 3, step 322; FIG. 4, step 409). If the encrypted file containing the advertisement statistics file fingerprint is deleted, the client software is disabled (FIG. 3, step 315; FIG. 4, step 404).

(IV) If the advertisement statistics file is altered en route to the server system 4, the fingerprint authentication of that file performed by the server system 4 upon receipt of the file will fail (FIG. 4, step 413). Alteration of the statistics file cannot be masked by a corresponding alteration of the statistics file's fingerprint, because the fingerprint is in encrypted form when transmitted from the client computer 2 to the server system 4 (FIG. 4, step 410). If the advertisement statistics file and its fingerprint are intercepted and deleted en route to the server system 4, the server system 4 will detect this because the expected upload of the statistics file will not occur.

As illustrated above, the advertisement authentication system of the present invention is capable of detecting various forms of advertisement and statistics file tampering. Because certain computer system failures can cause symptoms indistinguishable from those caused by tampering, the present invention does not immediately disable the client software whenever a "tampering" incident occurs. Thus, the present invention can be regarded as including a "forgiveness" feature, whereby remedial actions (such as client software disabling) are instituted only after, e.g., multiple incidents of "tampering" are detected within a short time period for the same user. Accordingly, in the steps set forth above, if tampering is detected the client program need not cease operations—the tampering event can be recorded and communicated to the server system 4 (e.g., in the advertisement statistics file or otherwise) and stored in the database management system 6. Thus, where appropriate, the advertiser is not charged if it is not certain that the advertisement was properly displayed. Optionally, if an advertisement is believed to have been altered, an unaltered copy of the advertisement can be retransferred from the server system 4 to the client computer 2.

While this disclosure refers specifically to the authentication of advertisements in an electronic mail system, it will be appreciated that the present invention is not limited to authentication of advertisements, nor to use with electronic mail systems. For example, the authentication system of the present invention can be used to detect alteration or deletion of various types of electronic information which can be downloaded by users of on-line systems for off-line use where it is desirable to ensure accuracy of such information and record when such information is used.

What is claimed is:

1. For use in an electronic mail system, a method for detecting unauthorized alteration of advertisements transferred from a remote computer and stored in a memory device of a local computer, comprising the steps of:
   (a) establishing a communications link between the local computer and the remote computer;
   (b) electronically transferring an advertisement from the remote computer to the local computer;
   (c) storing the advertisement in the memory device of the local computer;
   (d) electronically transferring e-mail messages between the local computer and the remote computer;
   (e) terminating the communications link between the local computer and the remote computer;
   (f) at the local computer, determining if the advertisement has been altered;
   (g) if the advertisement was not altered, outputting the advertisement at the local computer;
   (h) if the advertisement was altered, recording an alteration event in a statistics file stored in the memory device of the local computer; and
   (i) simultaneously with step (g), allowing a user at the local computer to create e-mail messages and to read e-mail messages received from the remote computer.

2. The method of claim 1 further comprising the steps of:
   (a) if the advertisement was not altered, recording in the statistics file when the advertisement was output;
   (b) re-establishing a communications link between the local computer and the remote computer;
   (c) electronically transferring the statistics file from the local computer to the remote computer;
   (d) electronically transferring e-mail messages between the local computer and the remote computer; and
   (e) terminating the communications link between the local computer and the remote computer.

3. The method of claim 2 further comprising the step of determining, at the remote computer, if the statistics file has been altered.

4. The method of claim 3 further comprising the step of utilizing the statistics file to create a billing account related to the advertisement.

5. The method of claim 1 wherein the local computer initiates the communications link with the remote computer.

6. The method of claim 1 where in the advertisement is output at the local computer regardless of whether e-mail messages are received from the remote computer.

7. The method of claim i further comprising the steps of:
   (a) compressing the advertisement prior to transfer to the local computer; and
   (b) decompressing the advertisement prior to output at the local computer.

8. The method of claim 1 further comprising an initial step of allowing the user at the local computer to create e-mail messages.

9. For use in an electronic mail system, a method for detecting unauthorized alteration of advertisements transferred from a remote computer and stored in a memory device of a local computer, comprising the steps of:
   (a) establishing a communications link between the local computer and the remote computer;
   (b) electronically transferring a first advertisement and a second advertisement from the remote computer to the local computer;
   (c) storing the first advertisement and the second advertisement in the memory device of the local computer;
   (d) electronically transferring e-mail messages between the local computer and the remote computer;
   (e) terminating the communications link between the local computer and the remote computer;
   (f) at the local computer, determining if the first advertisement has been altered;
   (g) if the first advertisement was not altered, outputting the first advertisement at the local computer;
   (h) if the first advertisement was altered, recording a first alteration event in a statistics file stored in the memory device of the local computer;
   (i) at the local computer, determining if the second advertisement has been altered;
   (j) if the second advertisement was not altered, outputting the second advertisement in replace of the first advertisement after a predetermined time;
   (k) if the second advertisement was altered, recording a second alteration event in the statistics file stored in the memory device of the local computer;
   (l) simultaneously with steps (g) and (j), allowing a user at the local computer to create e-mail messages and to read e-mail messages received from the remote computer.

10. The method of claim 9 further comprising the steps of:
   (a) recording in the statistics file if the first advertisement was output at the local computer;
   (b) recording in the statistics file if the second advertisement was output at the local computer;
   (c) re-establishing a communications link between the local computer and the remote computer;
   (d) electronically transferring the statistics file from the local computer to the remote computer;

(e) electronically transferring e-mail messages between the local computer and the remote computer; and (f) terminating the communications link between the local computer and the remote computer.

11. For use in an electronic mail system, a method for detecting unauthorized alteration of advertisements transferred from a remote computer and stored in a memory device of a local computer, comprising the steps of:

(a) at the remote computer, generating a fingerprint of an advertisement;

(b) at the remote computer, encrypting the fingerprint;

(c) establishing a communications link between the local computer and the remote computer;

(d) electronically transferring the advertisement from the remote computer to the local computer;

(e) electronically transferring the encrypted fingerprint from the remote computer to the local computer;

(f) storing the advertisement in the memory device of the local computer;

(g) storing the encrypted fingerprint in the memory device of the local computer;

(h) electronically transferring e-mail messages between the local computer and the remote computer;

(i) terminating the communications link between the local computer and the remote computer;

(j) at the local computer, determining if the advertisement has been altered by
   (1) generating a second fingerprint of the advertisement,
   (2) decrypting the encrypted fingerprint, and
   (3) comparing the decrypted fingerprint with the second fingerprint;

(k) if the advertisement was not altered, outputting the advertisement at the local computer;

(l) if the advertisement was altered, recording an alteration event in a statistics file stored in the memory device of the local computer; and (m) simultaneously with step (k), allowing a user at the local computer to create e-mail messages and to read e-mail messages received from the remote computer.

12. The method of claim 11 further comprising the steps of:

(a) if the advertisement was not altered, recording in the statistics file when the advertisement was output;

(b) re-establishing a communications link between the local computer and the remote computer;

(c) electronically transferring the statistics file from the local computer to the remote computer;

(d) electronically transferring e-mail messages between the local computer and the remote computer; and (e) terminating the communications link between the local computer and the remote computer.

13. The method of claim 11 further comprising the additional steps between steps (e) and (f) of:

(1) generating a third fingerprint of the advertisement;

(2) decrypting the encrypted fingerprint; and (3) comparing the decrypted fingerprint with the third fingerprint.

14. The method of claim 11 further comprising the steps of:

(1) at the local computer, generating a fourth fingerprint of the statistics file;

(2) encrypting the fourth fingerprint; and (3) storing the encrypted fourth fingerprint in the memory device of the local computer.

15. The method of claim 14 further comprising the steps of:

(a) re-establishing a communications link between the local computer and the remote computer;

(b) electronically transferring the statistics file from the local computer to the remote computer;

(c) electronically transferring the encrypted fourth fingerprint from the local computer to the remote computer;

(d) electronically transferring e-mail messages between the local computer and the remote computer; and (e) terminating the communications link between the local computer and the remote computer.

16. The method of claim 15 further comprising the steps of:

(1) at the remote computer, generating a fifth fingerprint of the statistics file;

(2) decrypting the encrypted fourth fingerprint; and (3) at the remote computer, comparing the fifth fingerprint with the fourth fingerprint to determine if the statistics file has been altered.

17. The method of claim 11 wherein the local computer initiates the communications link with the remote computer.

18. A method for detecting unauthorized alteration of advertisements transferred from a remote computer and stored in a memory device of a local computer, comprising the steps of:

(a) establishing a communications link between the local computer and the remote computer;

(b) electronically transferring an advertisement from the remote computer to the local computer;

(c) storing the advertisement in the memory device of the local computer;

(d) terminating the communications link between the local computer and the remote computer;

(e) at the local computer, determining if the advertisement has been altered;

(f) if the advertisement was not altered, outputting the advertisement at the local computer; and (g) if the advertisement was altered, recording an alteration event in a statistics file stored in the memory device of the local computer.

19. The method of claim 18 further comprising the steps of:

(a) if the advertisement was not altered, recording in the statistics file when the advertisement was output;

(b) re-establishing a communications link between the local computer and the remote computer;

(c) electronically transferring the statistics file from the local computer to the remote computer; and (d) terminating the communications link between the local computer and the remote computer.

20. The method of claim 19 further comprising the step of determining, at the remote computer, if the statistics file has been altered.

21. The method of claim 20 further comprising the step of utilizing the statistics file to create a billing account related to the advertisement.

22. The method of claim 18 wherein the local computer initiates the communications link with the remote computer.

23. The method of claim 18 further comprising the steps of:

(a) compressing the advertisement prior to transfer to the local computer; and (b) decompressing the advertisement prior to output at the local computer.

24. A method for detecting unauthorized alteration of advertisements transferred from a remote computer and stored in a memory device of a local computer, comprising the steps of:
   (a) establishing a communications link between the local computer and the remote computer;
   (b) electronically transferring a first advertisement and a second advertisement from the remote computer to the local computer;
   (c) storing the first advertisement and the second advertisement in the memory device of the local computer;
   (d) terminating the communications link between the local computer and the remote computer;
   (e) at the local computer, determining if the first advertisement has been altered;
   (f) if the first advertisement was not altered, outputting the first advertisement at the local computer;
   (g) if the first advertisement was altered, recording a first alteration event in a statistics file stored in the memory device of the local computer;
   (h) at the local computer, determining if the second advertisement has been altered;
   (i) if the second advertisement was not altered, outputting the second advertisement in replace of the first advertisement after a predetermined time; and
   (j) if the second advertisement was altered, recording a second alteration event in the statistics file stored in the memory device of the local computer.

25. The method of claim 24 further comprising the steps of:
   (a) recording in the statistics file if the first advertisement was output at the local computer;
   (b) recording in the statistics file if the second advertisement was output at the local computer;
   (c) re-establishing a communications link between the local computer and the remote computer;
   (d) electronically transferring the statistics file from the local computer to the remote computer; and
   (e) terminating the communications link between the local computer and the remote computer.

26. A method for detecting unauthorized alteration of advertisements transferred from a remote computer and stored in a memory device of a local computer, comprising the steps of:
   (a) at the remote computer, generating a fingerprint of an advertisement;
   (b) at the remote computer, encrypting the fingerprint;
   (c) establishing a communications link between the local computer and the remote computer;
   (d) electronically transferring the advertisement from the remote computer to the local computer;
   (e) electronically transferring the encrypted fingerprint from the remote computer to the local computer;
   (f) storing the advertisement in the memory device of the local computer;
   (g) storing the encrypted fingerprint in the memory device of the local computer;
   (h) terminating the communications link between the local computer and the remote computer;
   (i) at the local computer, determining if the advertisement has been altered by
      (1) generating a second fingerprint of the advertisement,
      (2) decrypting the encrypted fingerprint, and
      (3) comparing the decrypted fingerprint with the second fingerprint;
   (j) if the advertisement was not altered, outputting the advertisement at the local computer; and
   (k) if the advertisement was altered, recording an alteration event in a statistics file stored in the memory device of the local computer.

27. The method of claim 26 further comprising the steps of:
   (a) if the advertisement was not altered, recording in the statistics file when the advertisement was output;
   (b) re-establishing a communications link between the local computer and the remote computer;
   (c) electronically transferring the statistics file from the local computer to the remote computer;
   (d) electronically transferring e-mail messages between the local computer and the remote computer; and
   (e) terminating the communications link between the local computer and the remote computer.

28. The method of claim 26 further comprising the additional steps between steps (e) and (f) of:
   (1) generating a third fingerprint of the advertisement;
   (2) decrypting the encrypted fingerprint; and
   (3) comparing the decrypted fingerprint with the third fingerprint.

29. The method of claim 26 further comprising the steps of:
   (1) at the local computer, generating a fourth fingerprint of the statistics file;
   (2) encrypting the fourth fingerprint; and
   (3) storing the encrypted fourth fingerprint in the memory device of the local computer.

30. The method of claim 29 further comprising the steps of:
   (a) re-establishing a communications link between the local computer and the remote computer;
   (b) electronically transferring the statistics file from the local computer to the remote computer;
   (c) electronically transferring the encrypted fourth fingerprint from the local computer to the remote computer; and
   (d) terminating the communications link between the local computer and the remote computer.

31. The method of claim 30 further comprising the steps of:
   (1) at the remote computer, generating a fifth fingerprint of the statistics file;
   (2) decrypting the encrypted fourth fingerprint; and
   (3) at the remote computer, comparing the fifth fingerprint with the fourth fingerprint to determine if the statistics file has been altered.

32. The method of claim 31 wherein the local computer initiates the communications link with the remote computer.

33. An electronic mail system with advertising, comprising:
   a server system having a processor and a server memory, the server memory storing advertisements and e-mail messages; and
   a plurality of client computers, each client computer including a client memory and a processor, each client computer including means for establishing a communications link with the server system, means for electronically receiving e-mail messages and advertisements from the server system and sending e-mail messages to the server system, means for storing advertisements in the client memory, means for terminating the communications link with the server system, means for determining if a received advertisement has been altered, means for creating e-mail messages and reading e-mail messages received from the server system while the client computer is not electronically connected to the server system, means for outputting the received advertisement if the received advertisement was not altered while the client computer is not electronically connected to the server system, and means for recording in a statistics file in the client memory an indication that an advertisement has been altered.

34. The system of claim 33 wherein the server system is coupled to the Internet.

35. The system of claim 33 wherein each client computer further comprises means for recording in the statistics file when a received advertisement is output.

36. The system of claim 33 wherein each client computer further comprises means for electronically transmitting the statistics file to the server system.

37. The system of claim 36 wherein the server system further comprises means for determining if the statistics file has been altered.

38. The system of claim 37 wherein the server system further comprises means for utilizing the statistics file to create a billing account related to the output of advertisements at the plurality of client computers.

39. The system of claim 33 wherein advertisements are output to a user at the client computer while the user reads and creates e-mail messages.

40. The system of claim 33 wherein the means for determining if a received advertisement has been altered further comprises:

means for receiving from the server system a first encrypted fingerprint of the received advertisement;

means for decrypting the first encrypted fingerprint to produce a first fingerprint;

means for generating a second fingerprint of the received advertisement; and means for comparing the first fingerprint with the second fingerprint.

41. The system of claim 33 wherein each client computer further comprises means for alternating the output of advertisements according to a predetermined scheme.

42. The system of claim 33 wherein each client computer further comprises means for computing a fingerprint of the statistics file.

43. The system of claim 42 wherein each client computer further comprises means for recomputing the fingerprint of the statistics file when the statistics file is modified with authorization.

44. A system to ensure that electronic advertisements that are transferred from a remote computer system to a local computer are not tampered with, comprising:

a remote computer system transferring advertisements, corresponding encrypted fingerprints of each advertisement and electronic content to a plurality of local computers; and a plurality of local computers, each local computer capable of connecting with the remote computer system to receive and store advertisements, corresponding encrypted fingerprints of each advertisement and electronic content, each local computer utilizing the encrypted fingerprints of each advertisement to determine whether the corresponding advertisement is accurate prior to output at said remote computer, and thereafter outputting each accurate advertisement in turn at said local computer while said local computer is disconnected from the remote computer system.

45. The system of claim 44 wherein the advertisements are output at each local computer at the same time as the electronic content is output at said local computer.

46. The system of claim 44 wherein each local computer further comprises means for recording statistical information in a file, said statistical information including when each advertisement is displayed and whether each advertisement stored at said local computer is accurate.

47. The system of claim 46 wherein each local computer further comprises means for transferring the file of statistical information to the remote computer system.

48. The system of claim 44 wherein each local computer controls the output of the advertisement and wherein a user controls the output of the electronic content.

49. The system of claim 44 wherein the electronic content includes electronic mail messages.

50. The system of claim 49 wherein the remote computer system includes a plurality of mail servers.

* * * * *

UNITED STATES PATENT AND TRADEMARK OFFICE
CERTIFICATE OF CORRECTION

PATENT NO. : 5,838,790
DATED : 17 November 1998
INVENTOR(S) : Jon D. McAuliffe et al.

It is certified that error appears in the above-indentified patent and that said Letters Patent is hereby corrected as shown below:

| Column | Line |   |
|--------|------|---|
| 9 | 11 | Change "GE" to --$G_E$--. |
| 9 | 13 | Change "GE" to --$G_E$-- (two occurrences). |
| 12 | 14 | Change "claim i" to --claim 1--. |

Signed and Sealed this

Ninth Day of November, 1999

Attest:

Q. TODD DICKINSON

*Attesting Officer*    *Acting Commissioner of Patents and Trademarks*